May 4, 1965  A. N. BELL  3,181,361
LIQUID LEVEL MEASURING SYSTEM
Filed Sept. 21, 1962
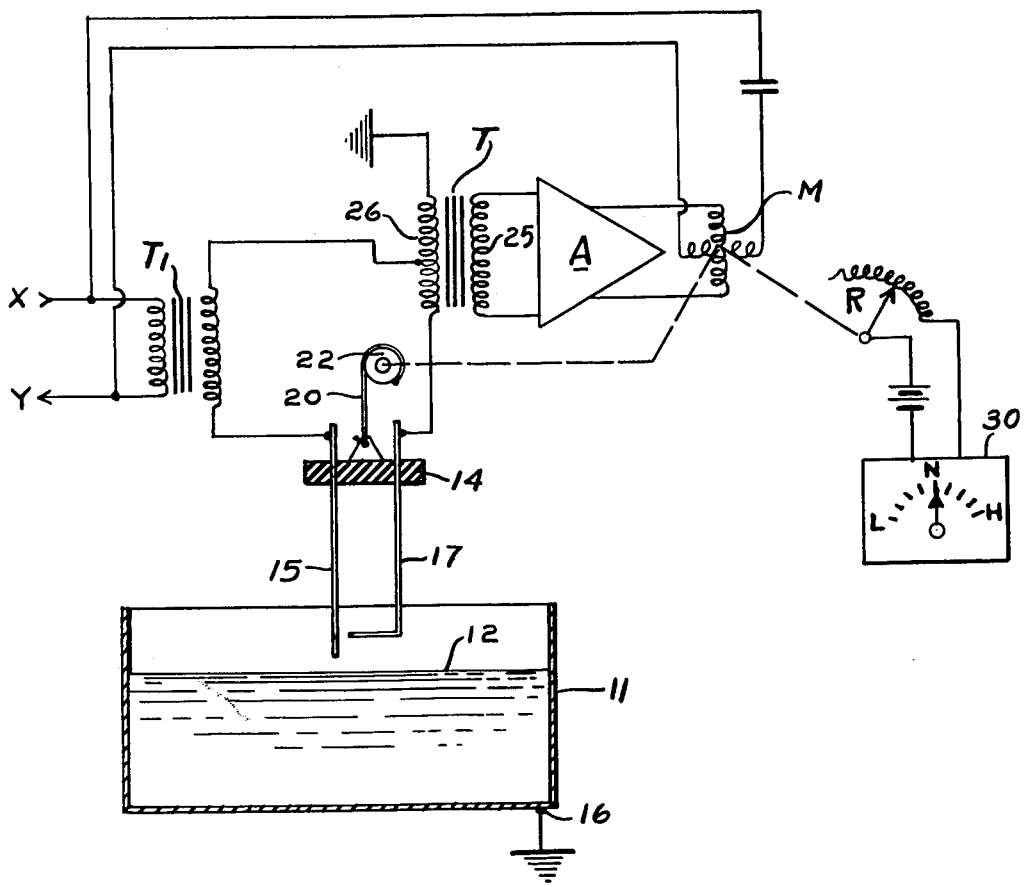
INVENTOR.
ALLEN N. BELL
BY
Clarence R. Patty, Jr.
ATTORNEY

United States Patent Office 3,181,361
Patented May 4, 1965

3,181,361
LIQUID LEVEL MEASURING SYSTEM
Allen N. Bell, Corning, N.Y., assignor to Corning Glass Works, Corning, N.Y., a corporation of New York
Filed Sept. 21, 1962, Ser. No. 225,312
2 Claims. (Cl. 73—290)

The present invention relates to liquid level measuring and is particularly concerned with the level measurement of liquids of high viscosity or corrosiveness.

According to the invention, which is herein applied by way of example to the measurement of the level of molten glass in a pool thereof, a probe electrode and an associated electrically conductive element are spaced from one another to form a reference spark gap and a second spark gap is formed between such probe and the liquid. These gaps are connected to give outputs of opposite phase in a circuit that includes a motor for maintaining the gap between the probe and liquid the same as that between the probe and the element of the reference gap and under which circumstances, the motor shaft remains stationary and is only operable when current is flowing unequally across such gaps to reposition the probe and reestablish the equal division of current flow between the respective gaps. The position of the top end of the probe with respect to a fixed reference point indicates the level of the liquid, or alternatively such level is indicated by a recorder or meter electrically connected to indicate the rotary position of the probe driving motor shaft.

For a more detailed description of the invention, reference is made to the accompanying drawing diagrammatically illustrating a typical installation embodying the invention.

Referring to the drawing in detail, the reference numeral 11 designates a container of liquid 12 the level of which is to be measured. Arranged over liquid 12 is a probe assembly 14 comprising a probe 15 whose bottom end is spaced from the top surface of liquid 12 which is grounded through a terminal 16. Thus, there is a spark gap provided between the top of liquid 12 and the bottom end of probe 15. A reference spark gap is also provided between probe 15 and the lower end of an element 17 forming part of the assembly 14.

Assembly 14 is suspended from a cable 20 wrapped about a pulley 22 carried by the shaft of a two phase motor M. One winding of motor M is directly supplied with energizing current from the X and Y terminals of a suitable current source, as indicated. The other winding of motor M is connected to the output side of an amplifier A supplied with potential from the secondary winding 25 of a transformer T. One end of the primary winding 26 of transformer T is connected to the element 17 and the other end is connected to ground. The center terminal of winding 26 is connected to one end of the secondary winding of a high voltage transformer T1 and whose other end is connected to probe 15. The primary winding of T1 is connected to the current supply terminals X and Y.

For the purpose of indicating positions of the probe assembly as its height varies with the liquid level height, a meter 30 in circuit with a rheostat R operated by motor M is conveniently provided.

In the operation of the system, so long as the bottom end of probe 15 is so spaced from the top of liquid 12 as to equally divide the current flow between the two gaps, the amount of current flow from the center point of winding 26 to its upper and lower ends is the same so that the current flow through the one cancels out the effect of the current flow through the other. Under these circumstances and assuming the liquid level as being normal, the meter needle may be set to its normal level position N to give such indication.

If the liquid level drops, a greater proportion of current flow will pass between element 17 and probe 15 and through the lower half of winding 26, so that the secondary winding 25 of transformer T will receive current in the proper phase relation to that supplied directly from terminals X and Y to cause motor M to turn its shaft counter clockwise until the space between probe 15 and the liquid 12 is the same as that between it and element 17. Then the meter will give an indication that the liquid level is below normal. Conversely, if the level of liquid 12 should increase above normal, the greater proportion of current flow will pass between the liquid 12 and probe 15 and through the upper half of winding 26. Under these circumstances, the secondary winding 25 of transformer T will receive current in the reverse phase relation and cause the motor to turn its shaft clockwise until the normal space relationship between the probe 15 and the liquid is reestablished. The meter 30 will, of course, at the same time give the high level indication.

The reference gap provided need not necessarily be located within the container unless varying atmospheric conditions exist in the spark gap area. For example, as would occur if flame heating of the liquid were employed. Under such circumstances, conductivity of the path between the probe and liquid is increased by such flames and to compensate for this, the reference gap is subjected to the same conditions.

What is claimed is:

1. In a system for measuring the level of an electrically conductive liquid, a vertically movable probe arranged thereover in spaced relation therewith forming a spark gap between the probe and the liquid, a motor for vertically moving said probe, means providing a reference spark gap, a circuit for operating said motor in one direction including one of such gaps and one part of the primary windings of a transformer, and a circuit for operating said motor in the reverse direction including the other of said gaps and another part of said primary winding, whereby as the level of the liquid is raised, one of said circuits is activated and as the level of the liquid is lowered, the other of said circuits is activated.

2. In a system for measuring the level of an electrically conductive liquid, a vertically movable probe arranged thereover in spaced relation therewith forming a spark gap between the probe and the liquid, a motor for vertically moving said probe, means providing a reference spark gap, a circuit for operating said motor in one direction including one of such gaps and a first primary winding section of a transformer, and a circuit for operating said motor in the reverse direction including the other of said gaps and another primary winding section of said transformer.

References Cited by the Examiner
UNITED STATES PATENTS

| | | | |
|---|---|---|---|
| 2,384,380 | 9/45 | Isserstedt | 318—29 |
| 2,513,295 | 7/50 | Eisenberg | 73—88.5 |
| 2,548,696 | 4/51 | Barstow et al. | |
| 3,087,114 | 4/63 | Lorenz | 324—71 |

ISAAC LISANN, *Primary Examiner.*